Figure 1:
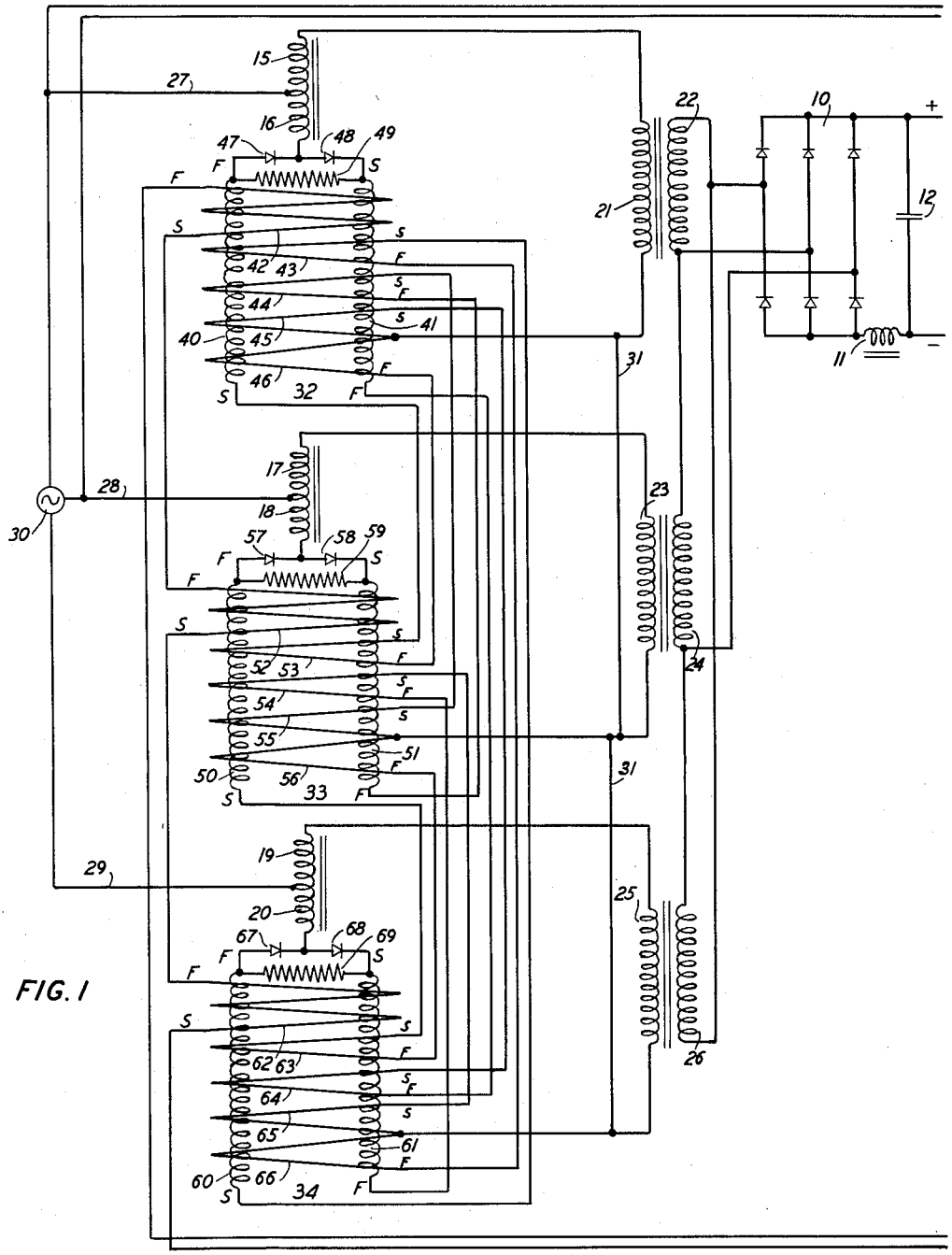

June 19, 1962 W. H. BIXBY 3,040,233
CURRENT SUPPLY APPARATUS
Filed April 6, 1959 2 Sheets-Sheet 1

INVENTOR
W. H. BIXBY
BY
G. F. Heuerman
ATTORNEY

INVENTOR
W. H. BIXBY
BY
ATTORNEY

United States Patent Office 3,040,233
Patented June 19, 1962

3,040,233
CURRENT SUPPLY APPARATUS
William H. Bixby, Columbus, Ohio, assignor, by mesne assignments, to North Electric Company, Galion, Ohio, a corporation of Ohio
Filed Apr. 6, 1959, Ser. No. 804,314
7 Claims. (Cl. 321—19).

This invention relates to current supply apparatus and more particularly to a three-phase booster regulator controlled battery charging rectifier.

This invention is an improvement over the invention disclosed and claimed in my patent application Serial No. 659,720, filed May 16, 1957, now Patent No. 2,945,172, granted July 12, 1960.

An object of the invention is to provide means for supplying substantially equal currents to a plurality of booster transformers from different phases of a multiphase alternating current supply source irrespective of voltage unbalance of the different phase respectively.

Another object is to provide an improved control circuit for voltage and current regulating apparatus.

In a specific embodiment of the invention, herein shown and described for the purpose of illustration, there is provided a three-phase rectifier for supplying current to a load which may comprise a floating battery. Current from a three-phase alternating current supply source is supplied to the rectifier input terminals through a circuit comprising three main transformers having Y-connected primaries and delta-connected secondaries. There are provided three booster transformers each having a series winding portion and a shunt winding portion. Each of the three conductors from the three-phase supply source is connected in a current path comprising the series winding of one of the booster transformers and the primary of one of the main transformers in series.

There are also provided three self-saturating reactors each having two impedance windings, a control winding and a plurality of balancing windings. Two current paths are provided for supplying current to the shunt winding of each booster transformer. For example, a first of the current paths comprises in series a balancing winding of a first reactor, a balancing winding of a second reactor, a first impedance winding of the first reactor, a first rectifying element and the shunt winding of a first booster transformer. The second of the current paths comprises in series the shunt winding of the first booster transformer, a second rectifying element, the second impedance winding of the first reactor, a balancing winding of the third reactor, and a balancing winding of the first reactor. The magnetomotive forces set up by the currents flowing through the balancing windings of the first reactor are in opposition to the magnetomotive forces set up due to the currents flowing through the impedance windings respectively of the first reactor. The magnetomotive forces set up by the currents in the balancing windings of the second and third reactors which are in series with an impedance winding of the first reactor set up magnetomotive forces which aid the magnetomotive forces set up by the currents supplied to the impedance windings of the second and third reactors, respectively. The currents supplied to the primaries of the main transformers, respectively are thus maintained substantially equal or balanced.

A control circuit comprising a magnetic amplifier is provided for controlling the current supplied to the control windings of the saturable reactors to control the impedance of the impedance windings of the reactors, thereby controlling the current in the shunt winding of each booster transformer. The voltage across the series winding of each booster transformer and the voltage across the primary of each main transformer are thus controlled. The operation is such that the load voltage is maintained substantially constant over a predetermined normal range of load current and that the load voltage decreases abruptly when the load current exceeds the normal operating range.

The magnetic amplifier of the control circuit comprises a control winding to which current is supplied for controlling the impedance of its impedance windings. There is impressed upon the magnetic amplifier control winding, when the load current is in the normal operating range, a control voltage equal to the difference of a substantially constant reference voltage and a voltage which varies in accordance with load voltage changes. There is derived from the load circuit a voltage which is proportional to load current and which is equal to the reference voltage when the load current is equal to the maximum value of the normal current range. A voltage equal to the difference of the voltage proportional to load current and the reference voltage is impressed upon the base-emitter circuit of a transistor which is non-conducting or cut off when the load current is in the normal operating range. The transistor is made conducting in response to excessive load current. Conduction of the transistor causes to be introduced into the circuit of the magnetic amplifier control winding an additional voltage component of relatively large magnitude in aiding relationship with respect to the control voltage component which is proportional to load voltage. As a result, the voltage supplied by each of the booster transformers is sharply reduced to cause an abrupt decrease in load voltage and to cause the load current to be maintained substantially constant.

In addition to the sharp current limiting action when the load current exceeds the normal operating range and the balanced output ripple, the performance characteristics of the regulated rectifier include good apparatus economy, high conversion efficiency, high input power factor, very close voltage regulation and wide frequency tolerance.

Figure 2:
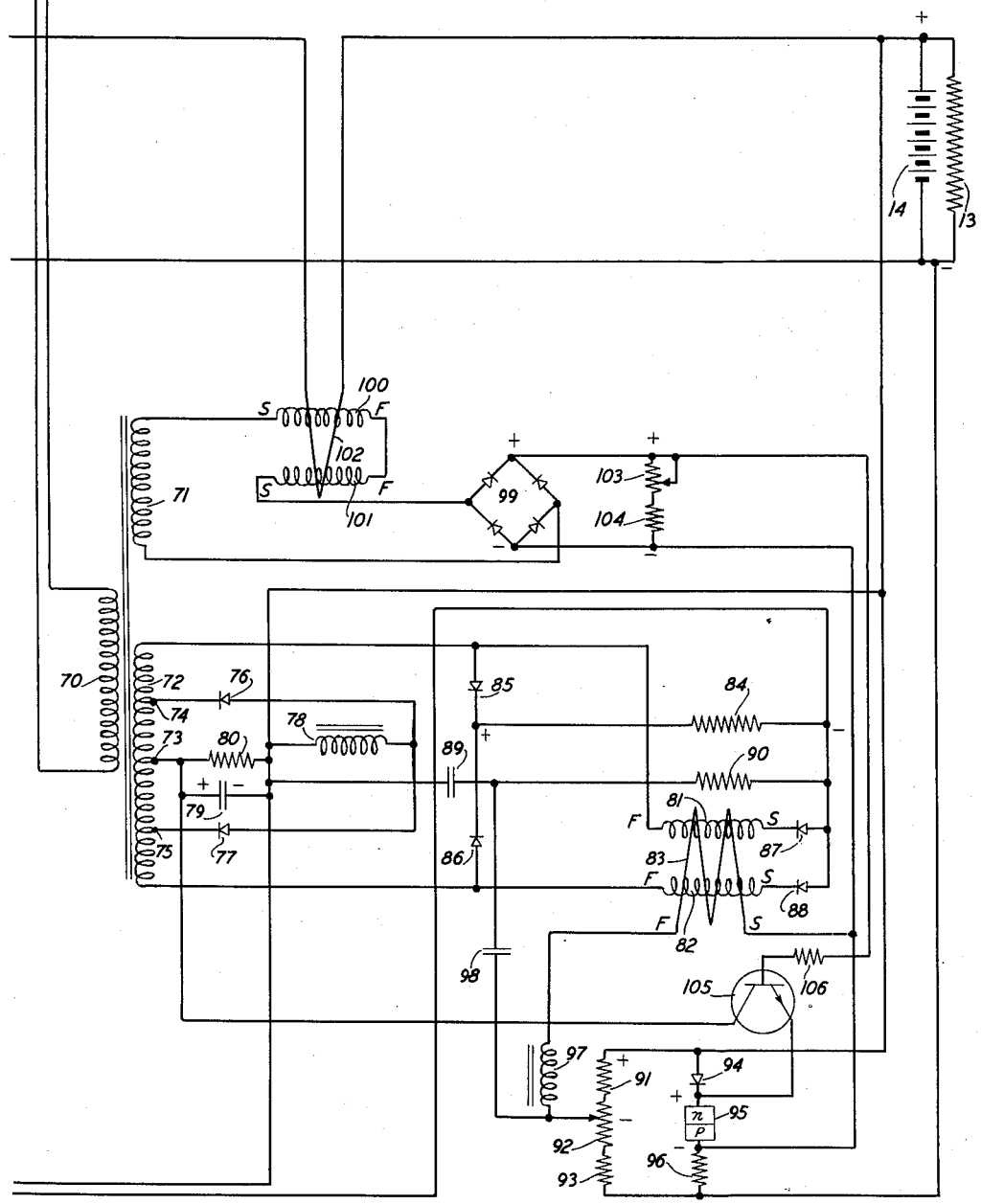

The invention will now be described in greater detail with reference to the accompanying drawing in which FIGS. 1 and 2 when placed side by side with FIG. 1 to the left are a schematic view of a current supply circuit embodying the invention.

Referring now to the drawing, there are provided a three-phase rectifier 10 and its ripple filter comprising a series inductor 11 and a shunt capacitor 12 for supplying direct current to a load circuit comprising a load 13 across which a floating battery 14 may be connected. The rectifier 10 is energized by current from a three-phase alternating current supply source 30 through a circuit comprising similar booster transformers having series windings 15, 17 and 19, respectively, and having shunt windings 16, 18 and 20, respectively, and similar main transformers having Y-connected primary windings 21, 23 and 25, respectively, and delta-connected secondary windings 22, 24 and 26, respectively. A current path may be traced from a line 27 connected to the source 30 through booster transformer series winding 15 and primary winding 21 of a main transformer to the neutral conductor 31 connecting a terminal of each of transformer windings 21, 23 and 25. A similar current path may be traced from the line 28 through series winding 17 and through transformer primary 23 to the neutral conductor 31. A third current path may be traced from the line 29 through booster series winding 19 and primary transformer winding 25 to the neutral conductor 31. The voltage across the transformer primary 21, for example, is equal to the vector sum of the voltage across line 27 and the neutral conductor 31 and the voltage across the series winding 15 of the booster transformer.

The voltage across the series winding 15 is determined by the current flowing through the shunt winding 16.

Saturable reactors 32, 33 and 34 are provided for controlling the currents supplied to booster shunt windings 16, 18 and 20, respectively. Reactor 32 comprises two impedance windings 40 and 41, a control winding 42 and balancing windings 43, 44, 45 and 46. Reactor 33 comprises impedance windings 50 and 51, a control winding 52, and balancing windings 53, 54, 55 and 56. Reactor 34 comprises impedance windings 60 and 61, a control winding 62, and balancing windings 63, 64, 65 and 66.

When line 27 is negative with respect to the conductor 31, current flows through a current path comprising in series balancing windings 46 and 53, impedance winding 40, a rectifying element 47 and booster shunt winding 16. When line 27 is positive with respect to conductor 31, current flows through a current path comprising booster shunt winding 16, rectifying element 48, impedance winding 41 and balancing windings 64 and 45. When line 28 is negative with respect to conductor 31, current flows in a path comprising in series balancing windings 56 and 63, impedance winding 50, rectifying element 57 and booster shunt winding 18. When line 28 is positive with respect to conductor 31, current flows through a path comprising in series booster shunt winding 18, rectifying element 58, impedance winding 51 and balancing windings 44 and 55. When line 29 is negative with respect to conductor 31, current flows through a path comprising in series balancing windings 66 and 43, impedance winding 60, rectifying element 67 and the booster shunt winding 20. When line 29 is positive with respect to the conductor 31, current flows through a path comprising in series booster transformer shunt winding 20, rectifying element 68, impedance winding 61 and balancing windings 54 and 65. A resistor 49 is provided in a path connecting the common terminal of impedance winding 40 and rectifying element 47 and the common terminal of impedance winding 41 and rectifying element 48. Resistors 59 and 69 are similarly connected to the impedance windings of reactors 33 and 34, respectively.

The balancing windings 43 to 46, 53 to 56 and 63 to 66, have equal turns. The impedance windings of the saturable reactors have equal turns and are similarly wound from a start terminal S to a finish terminal F on the outer legs respectively of a three-legged core. The current flowing through each of these impedance windings flows into the S termiinal and out of the F terminal. The control winding and the balancing windings of each reactor are similarly wound from a start terminal S to a finish terminal F on the middle leg of the core. The control windings also have equal turns. It will be noted that windings 45 and 46, for example, have a common terminal which is the S terminal of winding 46 and the F terminal of winding 45. It will be noted further than the current which flows into the S terminal of winding 40, for example, also flows into the S terminal and out of the F terminal of winding 46 and into the F terminal and out of the S terminal of winding 53. The magnetomotive force due to the current in winding 46 thus opposes the magnetomotive force due to the current in winding 40 in the magnetic circuit for these windings and the magnetomotive force due to the current in winding 53 aids the magnetomotive force due to the current in winding 50 in the magnetic circuit for windings 50 and 53. The current which flows through winding 41 also flows through winding 45 and the magnetomotive force due to winding 45 opposes the magnetomotive force due to winding 41.

Thus the magnetomotive force due to the current in winding 40 or winding 41 of reactor 32 is opposed by the magnetomotive force due to current in one of the windings 45 or 46 and is aided by the magnetomotive forces due to the currents in windings 43 and 44. Similarly the magnetomotive force due to winding 50 or 51 of reactor 33 is opposed by the magnetomotive force due to winding 55 or 56 and is aided by the magnetomotive forces due to windings 53 and 54 and the magnetomotive force due to winding 60 or 61 of reactor 34 is opposed by the magnetomotive force due to winding 65 or 66 and is aided by the magnetomotive forces due to windings 63 and 64. When the output currents of the regulators flowing through the main transformer primary windings 21, 23 and 25 are balanced, the current flowing through winding 45 or 46 and the currents flowing through windings 43 and 44, respectively, are also balanced, that is, the vector sum of these currents is equal to zero. So also the current flowing through winding 55 or 56 and the currents flowing through windings 53 and 54 are balanced and the current through winding 65 or 66 and the currents through windings 63 and 64 are balanced. If the output of reactor 32 should increase slightly with respect to the outputs of reactors 33 and 34, for example, the increased currents in windings 45 and 46 will cause the impedance of windings 40 and 41 to increase and the increased currents supplied to windings 53 and 64 will cause the impedance of windings 50, 51, 60 and 61 to decrease, thereby returning the output currents of the reactors to the balanced condtion. The circuit operates similarly in response to an increase or a decrease of the output currents of the reactors 33 and 34. The currents supplied to the main transformer primaries 21, 23 and 25 are thus maintained closely balanced.

The resistors 49, 59 and 69 act through the impedance windings to provide a lagging effect in the control magnetic path somewhat similar to short-circuited turns on the middle leg of the reactor core. This lagging effect will tend to average the time varying magnetomotive forces due to the windings on the middle leg of any one reactor. Cyclical variations will thus be smoothed out and only the averages over a number of cycles will be active.

The importance of the balanced operation described above will be apparent from a brief consideration of the effects of unbalanced operation. The principal disadvantage of unbalanced operation is that the windings which carry the larger currents will exhibit increased heating, thereby necessitating a limitation on the power output considerably below that which the components should be capable of providing. Another disadvantage, almost as serious as the first, is that when any appreciable unbalance is present in the output of the regulator, considerable double line-frequency and triple line-frequency ripple voltage components will be present in the output from the rectifier. These components which are of low frequency with respect to the six times line frequency of the fundamental balanced ripple component are relatively difficult to filter from the output current of the rectifier. This is due to the fact that both the inductor and the capacitor of the ripple filter become more effective in ripple reduction as the frequency of the ripple increases. The result is that the ripple reduction factor for the filter increases very nearly as the square of the ripple frequency.

Moreover, the magnitude of the ripple current output from the rectifier before filtering increases very rapidly as the line unbalance is increased. For example, it has been calculated that an eleven percent unbalance in the input line to line voltages will result in a double-frequency component in the rectifier output voltage equal in magnitude to the sextuple-frequency component. When using a choke input filter 11, 12, as shown, having a resonant frequency of 40 cycles per second and if the line frequency is 60 cycles per second, a 1.1 percent unbalance in the input line to line voltages will result in a double-frequency component in the filtered output equal in magnitude to the sextuple-frequency component.

A control circuit is provided for supplying control current to the control windings 42, 52 and 62 connected in series. Current from the lines 27 and 28 is supplied to the primary winding 70 of a transformer having secondary windings 71 and 72. Secondary winding 72 has a mid-tap 73 and taps 74 and 75 between the tap 73 and the end terminals respectively of winding 72. A rectifier comprising rectifying elements 76 and 77 and a ripple filter comprising an inductor 78 and a capacitor 79 are provided for supplying direct current to a resistor 80 to set up a direct voltage thereacross. The circuit may be traced from the mid-tap 73 of winding 72, through resistor 80 shunted by condenser 79 and through inductor 78 to a common terminal which is connected through rectifying element 76 to terminal 74 and which is connected through rectifying element 77 to terminal 75. There is provided a self-saturating magnetic amplifier comprising impedance windings 81 and 82 which may be similarly wound from terminal S to terminal F on the outer legs respectively of a three-legged core and a control winding 83 which may be similarly wound from S to F on the middle leg of the core. There is provided a rectifying bridge circuit having a pair of input vertices connected to the end terminals of transformer winding 72 and a pair of output terminals across which a resistor 84 is connected. A first and a second arm of the bridge comprise rectifying elements 85 and 86, respectively. The third arm comprises a rectifying element 87 in series with winding 81 and the fourth bridge arm comprises rectifying element 88 in series with winding 82. When the magnetic amplifier is in the completely unsaturated state, very little current will flow through the impedance windings 81 and 82. Current will then flow from a common terminal of rectifying elements 85 and 86, through resistor 84 into the S terminal and out of the F terminal of winding 62, into the S terminal and out of the F terminal of winding 52, into the S terminal of winding 42, from the F terminal of winding 42 to the negative terminal of resistor 80 and condenser 79 in parallel and thence to the mid-terminal 73 of transformer winding 72. As the impedance of the windings 81 and 82 decreases, the voltage across resistor 84 will increase with the result that the current flowing into the S terminals and out of the F terminals of the control windings 42, 52 and 62 will decrease and may even reverse so as to flow into the F terminals and out of the S terminals of windings 42, 52 and 62. A filtering condenser 89 and a resistor 90 in series are provided in a path connecting the common terminal of rectifying elements 87 and 88 and the negative terminal of condenser 79.

Two current paths are connected across the load 13, 14. One of these paths comprises in series a resistor 91, a potentiometer 92 and a resistor 93. The second of the current paths comprises in series a rectifying element or diode 94, a p-n junction constant voltage diode 95 and a resistor 96. The variable tap of potentiometer 92 is connected through an inductor 97 to the F terminal of control winding 83 and through a filtering condenser 98 to the common terminal of condenser 89 and resistor 90. The common terminal of the constant voltage diode 95 and resistor 96 is connected to the S terminal of control winding 83.

There is provided a bridge rectifier 99 to the input of which current is supplied from secondary transformer winding 71 through the impedance windings 100 and 101 of a saturable reactor which may be similarly wound from the S to the F terminal on the outer legs respectively of a three-legged core. This reactor also has a control winding 102 which may be a single turn wound on the middle leg of the core and connected in series in the load circuit between the positive output terminal of rectifier 10 and the positive terminal of the load 13, 14. A rheostat 103 and a resistor 104 are connected in series across the output terminals of rectifier 99. The core for the windings 100, 101 and 102 may be constructed of a material requiring negligible magnetizing ampere-turns so that the reactor will have the characteristic that the rectified average ampere-turns in either of the impedance windings will equal the average ampere-turns in the control winding 102. Since the output current of rectifier 99 is the rectified average of the current in the impedance windings, this current will be related to the load current by the ratio of control winding turns to the turns in one of the impedance windings. By a suitable choice of this turns ratio and the resistance of the path comprising rheostat 103 and resistor 104, the voltage drop across this path can be made equal to the voltage across the reference diode 95 when the load current has the maximum amplitude of the normal operating current range.

There is provided an n-p-n type transistor 105 having a collector, an emitter and a base. The positive terminal of the resistance path 103, 104 is connected through a current limiting resistor 106 to the base of transistor 105 and the negative terminal of the resistance path 103, 104 is connected to the common terminal of the reference diode 95 and resistor 96. The emitter of transistor 105 is connected to the common terminal of rectifying diode 94 and the constant voltage diode 95. The collector of transistor 105 is connected to the positive terminal of condenser 79.

The reference voltage across the diode 95 is normally greater than or equal to the voltage across the path 103, 104 and therefore the transistor 105 is cut off. When the load current increases to an amplitude larger than the maximum amplitude of the normal load current range, the voltage across the path 103, 104 becomes larger than the reference voltage across diode 95 and current begins to flow into the base and out of the emitter of transistor 105. As a result current flows in a circuit which may be traced from the positive load terminal through a series path comprising resistor 80, the collector-emitter path of transistor 105, reference diode 95 and resistor 96 to the negative load terminal. With the transistor 105 conducting, there is impressed across the rectifying diode 94 a voltage equal to the voltage across condenser 79 minus the voltage drop in the collector-emitter path of transistor 105, this voltage across diode 94 being in a direction to aid the voltage across resistor 91 and a portion of potentiometer 92 in the circuit for supplying control current to the magnetic amplifier control winding 83.

When the load current is in the normal operating range, the voltage across diode 94 is relatively small and constant and in aiding relationship with respect to the reference voltage across the reference diode 95. The voltage across resistor 91 and a portion of the resistance of potentiometer 92 is larger than the sum of the voltages across diodes 94 and 95. Thus current flows into the S terminal and out of the F terminal of control winding 83. If the load voltage should increase, for example, the current in control winding 83 will increase to cause the impedance of windings 81 and 82 to increase. As a result the voltage drop across resistor 84 is decreased to cause increased current to be supplied to the control windings 42, 52 and 62 in series of reactors 32, 33 and 34, respectively. The impedance of impedance windings 40, 41, 50, 51, 60 and 61 is thus increased to cause a reduction of the currents supplied to the shunt windings 16, 18 and 20 of the booster transformers. Therefore, the balanced currents supplied to the main transformer primary windings 21, 23 and 25 are decreased, thereby minimizing the assumed increase of load voltage. If the load current should increase to a value larger than the maximum value of the normal operating current range, transistor 105 is made conductive to cause to be set up across the diode 94 a voltage which opposes the reference voltage across the reference diode 95. The current flowing into the S terminal and out of the F terminal of control winding 83 is thus abruptly increased with the result that the impedance of the impedance windings of reactors 32, 33 and 34 is increased to cause a reduction of the currents supplied to transformer windings 21, 23 and 25, respectively. The output current of rectifier 10 is thus reduced to cause a sharp reduction of load voltage and a limitation of the load current.

What is claimed is:

1. In combination, a first and a second booster transformer having first and second series windings respectively and having first and second shunt windings respectively, a first and a second rectifier, a first saturable reactor having a first impedance winding and first and second balancing windings, a second saturable reactor having a second impedance winding and third and fourth balancing windings, circuits comprising said first and second series windings respectively for supplying current from an alternating current supply source to a load, means for supplying current from said source to a first current path comprising said first shunt winding, said first rectifier, said first impedance winding and said first and third balancing windings all in series, and means for supplying current from said source to a second current path comprising said second shunt winding, said second rectifier, said second impedance winding and said second and fourth balancing windings all in series, said first and second balancing windings setting up magnetomotive forces which oppose and aid respectively the magnetomotive force set up by said first impedance winding, said third and fourth balancing windings setting up magnetomotive forces which aid and oppose respectively the magnetomotive force set up by said second impedance winding.

2. The combination with means for supplying direct current to a load circuit including a load and regulating means for controlling the current supplied to the load circuit, of means for deriving from said load circuit a first voltage proportional to load voltage, a source of substantially constant reference voltage, means for minimizing load voltage changes over a normal range of load current including a predetermined maximum value comprising means for impressing upon said regulating means a control voltage substantially equal to the difference of said reference voltage and said first voltage, means for deriving from said load circuit a second voltage which is continuously proportional to load current over a range including said normal range of load current and which is substantially equal to said reference voltage when the load current has said predetermined maximum value, and means responsive to the difference of said second voltage and said reference voltage when said second voltage increases to a value larger than said reference voltage for causing said load voltage to decrease.

3. The combination with means for supplying current from a direct current supply source to a load, of means for regulating the load current and voltage, a rectifying diode, a constant voltage device, means for supplying direct current through said rectifying diode in its forward direction to said constant voltage device to set up a substantially constant reference voltage equal to the sum of the voltage across said constant voltage device and the forward voltage across said rectifying diode, means for impressing upon said regulating means a voltage equal to the difference of a voltage proportional to the load voltage and said reference voltage for causing load voltage changes to be minimized, and means for limiting said load current comprising means responsive to load current in excess of a predetermined amplitude for impressing a reverse voltage across said rectifying diode.

4. The combination with means for supplying current from a direct current supply source to a load circuit including a load, of means for regulating the load current and voltage, a voltage divider across said load for deriving a voltage proportional to load voltage and having a tap between said load terminals, a rectifying diode, a constant voltage device, a resistor, a current path connected across said load comprising in series and in order said rectifying diode poled to conduct current in its forward or low resistance direction, said constant voltage device and said resistor, means for impressing upon said regulating means the voltage between said voltage divider tap and the common terminal of said constant voltage device and said resistor, thereby maintaining a substantially constant load voltage over a normal load current operating range, a transistor having a collector, an emitter and a base, means for deriving from said load circuit a voltage proportional to load current having a value equal to the voltage across said constant voltage device when said load current has a predetermined maximum value, means for impressing upon the emitter-base circuit of said transistor a voltage equal to the difference of said voltage proportional to load current and the voltage across said constant voltage device to change the collector-emitter path of said transistor from cut-off to a conducting state when the load current increases above said maximum value, and means responsive to the conductance of said collector-emitter path for impressing a reverse voltage across said rectifying diode, thereby controlling said regulating means to limit the increase of load current.

5. In combination, a first magnetic amplifier having a first control winding and a first and a second impedance winding, a second magnetic amplifier having a second control winding and a third impedance winding, a transformer having a primary winding to which current may be supplied from an alternating current source and having a secondary winding, said secondary winding having a midtap, a rectifier bridge having four arms forming a pair of input terminals and positive and negative output terminals, means for connecting said input terminals to said transformer secondary winding, a resistor, means for connecting said resistor across said positive and negative output terminals, means for connecting said first impedance winding in one of said bridge arms, means for connecting said second impedance winding in another of said bridge arms, a current path comprising said second control winding connecting the mid-tap of said secondary winding to the negative output terminal of said rectifier bridge, means for supplying to said first control winding a control current which may vary for controlling the impedance of said first and second impedance windings to thereby control the current supplied to said second control winding, means responsive to the current supplied to said second control winding for controlling the impedance of said third impedance winding, and means responsive to the impedance of said third impedance winding for controlling the current supplied from a supply source to a load.

6. Apparatus for supplying rectified alternating current from a three-phase alternating current supply source to a load comprising a three-phase rectifier for supplying rectified current to said load, three transformers having Y-connected primary windings and Δ-connected secondary windings connected to the input terminals of said rectifier, a first, a second and a third booster transformer each having a series winding and a shunt winding, means for supplying currents from different phase conductors respectively of said source through said series booster windings and said transformer primary windings respectively to the neutral conductor connecting said primary windings, a first, a second and a third saturable reactor each having a first and a second impedance winding, a control winding and a first, a second, a third and a fourth balancing winding, a plurality of rectifying elements one for each of said impedance windings, a first current path connecting a first of said phase conductors to said neutral conductor comprising in series the shunt winding of the first booster transformer, a first of said rectifying elements, said first impedance winding of said first reactor, said first balancing winding of said second reactor and said fourth balancing winding of said first reactor, a second current path connecting said first phase conductor to said neutral conductor comprising in series the shunt winding of said first booster transformer, a second rectifying element, said second impedance winding of said first reactor, said second balancing winding of said third reactor and said third balancing winding of said first reactor, a third current path connecting said second phase conductor to said neutral conductor comprising in series the shunt winding of said second booster transformer, a third rectifying element, the first impedance winding of said second reactor, the first balancing winding of said third reactor and the fourth balancing winding of said second reactor, a fourth current path connecting said second phase conductor to said neutral conductor comprising in series the shunt winding of said second booster transformer, a fourth rectifying element, the second impedance winding of said second reactor, the second balancing winding of said first reactor and the third balancing winding of said second reactor, a fifth current path connecting said third phase conductor to said neutral conductor comprising in series the shunt winding of said third booster transformer, a fifth rectifying element, the first impedance winding of said third reactor, the first balancing winding of said first reactor and the fourth balancing winding of said third reactor, a sixth current path connecting said third phase conductor to said neutral conductor comprising in series the shunt winding of said third booster transformer, the sixth of said rectifying elements, the second impedance winding of said third reactor, the second balancing winding of said second reactor and the third balancing winding of said third reactor, and means for supplying to said control windings in series a current for regulating the current supplied from said rectifier to said load.

7. Apparatus for supplying rectified alternating current from a three-phase alternating current supply source to a load in accordance with claim 6 in which said means for supplying current to said control windings in series comprises a voltage divider across said load for deriving a voltage proportional to load voltage and having a tap between said load terminals, a rectifying diode, a constant voltage device, a resistor, a current path connected across said load comprising in series and in order said rectifying diode poled to conduct current in its forward or low resistance direction, said constant voltage device and said resistor, a magnetic amplifier having an output for supplying control current to said control windings in series of said first, second and third reactors and having a second control winding, means for impressing upon said second control winding the voltage between said voltage divider tap and the common terminal of said constant voltage device and said resistor, thereby maintaining a substantially constant load voltage over a normal load current operating range, a transistor having a collector, an emitter and a base, means for deriving from said load circuit a voltage proportional to load current having a value equal to the voltage across said constant voltage device when said load current has a predetermined maximum value, means for impressing upon the emitter-base circuit of said transistor a voltage equal to the difference of said voltage proportional to load current and the voltage across said constant voltage device to change the emitter-collector path of said transistor from cut-off to a conducting state when the load current increases to a value above said maximum value, and means responsive to the conductance of said collector-emitter path for impressing a reverse voltage across said rectifying diode, thereby causing an abrupt decrease of load voltage.

References Cited in the file of this patent
UNITED STATES PATENTS

| | | |
|---|---|---|
| 2,511,219 | Pogorzelski | June 13, 1950 |
| 2,875,395 | Blashfield | Feb. 24, 1959 |
| 2,875,396 | Christie et al. | Feb. 24, 1959 |

OTHER REFERENCES

"Magnetic Amplifiers Regulate D.-C. Supply" by M. B. Meunier; published by Electronics (February 28, 1958); pages 68–70 relied on.